(12) United States Patent
Kim et al.

(10) Patent No.: US 7,619,222 B2
(45) Date of Patent: Nov. 17, 2009

(54) AUTOMATIC RADIOACTIVITY ANALYZER OF MIXED LIQUID BETA EMITTER

(75) Inventors: Cheol-Su Kim, Daejeon (KR);
Byung-Hwan Rho, Choong-Nam (KR);
Chang-Kyu Kim, Seibersdorf (AT)

(73) Assignee: Korea Institute of Nuclear Safety, Taejon (KR)

( * ) Notice: Subject to any disclaimer, the term of this patent is extended or adjusted under 35 U.S.C. 154(b) by 184 days.

(21) Appl. No.: 11/919,978

(22) PCT Filed: Jul. 15, 2005

(86) PCT No.: PCT/KR2005/002278

§ 371 (c)(1),
(2), (4) Date: Nov. 6, 2007

(87) PCT Pub. No.: WO2007/004763

PCT Pub. Date: Jan. 11, 2007

(65) Prior Publication Data

US 2009/0078884 A1    Mar. 26, 2009

(30) Foreign Application Priority Data

Jul. 1, 2005    (KR) .................... 10-2005-0059095

(51) Int. Cl.
  *G01N 21/01* (2006.01)
  *G01N 21/51* (2006.01)
  *G01N 23/10* (2006.01)
  *G01N 23/12* (2006.01)
(52) U.S. Cl. .................. 250/364; 250/328; 250/369; 250/362; 250/366; 250/363.01; 250/252.1; 250/303; 250/393; 436/57; 436/100; 436/181; 422/159; 252/301.16; 252/301.17; 588/20; 588/307
(58) Field of Classification Search ............. 250/432 R, 250/328, 364, 369, 362, 366, 363.01, 252.1, 250/303, 393; 436/57, 100, 181; 422/159; 252/301.16, 301.17; 588/20, 307
See application file for complete search history.

(56) References Cited

U.S. PATENT DOCUMENTS

| | | | | |
|---|---|---|---|---|
| 5,512,753 | A  * | 4/1996 | Thomson et al. | ........ 250/361 R |
| 6,791,093 | B2 * | 9/2004 | Caldwell et al. | ............ 250/395 |
| 7,427,761 | B2 * | 9/2008 | Ohtaka et al. | ............... 250/393 |

* cited by examiner

*Primary Examiner*—Jack I Berman
*Assistant Examiner*—Meenakshi S Sahu
(74) *Attorney, Agent, or Firm*—McDermott Will & Emery LLP (57) ABSTRACT

The present invention relates to an automatic radioactivity analyzer of mixed liquid beta emitter which comprises: a sample preparation part (1, 2, 3, 4, 5, 6, and 7) for extracting a liquid sample from liquid-phase radioactive nuclear wastes; a sample injection part (9 and 10), including a sample transportation part for transporting a bottled sample to a radioactivity detection part to perform measurement; the radioactivity detection part (11) including two photon multiplier tubes; an exterior gamma-ray source injection part (12) for compensating for measurement efficiency according to quenching effects; a signal processing part (13), including a pre-amplifier circuit (14), a high-voltage generator circuit (15), an analogue-to-digital converter circuit (21), and a digital signal processor (DSP) (24), for generating beta spectrums by the aid of a fast coincidence counter (20) and a multi-channel analyzer (22); a main control PC (25) and a graphic user interface (GUI) program (29) for remotely automatically measuring the sample and analyzing the beta emitter; and an Ethernet communication part (28) for performing the remote-control of the analyzer and long-range reception/transmission of the measured data.

7 Claims, 5 Drawing Sheets

AUTOMATIC RADIOACTIVITY ANALYZER OF MIXED LIQUID BETA EMITTER

RELATED APPLICATIONS

This application is the U.S. National Phase under 35 U.S.C. 371 of International Application No. PCT/KR2005/002278, filed on Jul. 15, 2005, which in turn claims the benefit of Korean Application No. 10-2005-0059095, filed on Jul. 1, 2005, the disclosures of which Applications are incorporated by reference herein.

TECHNICAL FIELD

The present invention relates to an automatic radioactivity analyzer of mixed liquid beta-ray emitting nuclides (hereinafter, referred to as "beta emitter"), which automatically monitors the concentration of mixed beta emitters existing in radioactive liquid wastes produced after the use of a radioactive isotope, by automatically performing collection of a sample and analysis of radioactivity concentration, and remotely transmitting the analyzed result.

BACKGROUND ART

The present invention belongs to the technical filed of analyzing radioactive nuclides, including an apparatus or system for remotely monitoring liquid wastes produced from the radioactivity handling facilities and a liquid-phase environmental sample contaminated by radiation accidents.

The present invention relates to an apparatus and system for remotely analyzing radioactivity nuclides, in which a central computer controls all the following processes and transceives the resulting data in real time: on-line collecting liquid-phase radioactive nuclear wastes, preparing a sample to be measured, analyzing radioactivity from the sample, and analyzing the final results.

In a conventional method of analyzing beta emitting nuclides (also called, "beta emitters") existing in the liquid wastes, the beta emitters to be analyzed was purely extracted out of a sample acquired from the wastes by means of a chemical separation method, and measured by using a liquid scintillation counter. However, in such a method, an analyzing person suffers from an inconvenience of having to collect a sample from the wastes by himself/herself every analysis, and there was a possibility that the analyzing person might be exposed to the radioactivity and the environment might be contaminated by the radioactive nuclides existing in the sample.

In addition, if various mixed beta emitters exist in a sample, it was not possible to discriminate the respective beta emitters because of spectral overlap between the beta emitters having the similar energy level. Therefore, conventionally, the respective dedicated analyzing methods, each of which conforms to the respective nuclides had to be used. So, much time and efforts are required to analyze the beta emitters.

Furthermore, since a conventional liquid scintillation counter necessitated the heavy-weighed lead for shielding the influence of the exterior radiation, it was quite difficult to transport and set up the counter. Thus, radioactive analysis could be performed only in a laboratory, and therefore, there was a limitation in a prompt action against the radiation accident.

Therefore, to overcome the above problems of the conventional liquid scintillation counter, that collection and preparation of a sample to be measured should be performed manually and only a single nuclide can be analyzed from a single sample, the present invention provides an automatic radioactivity analyzer of mixed liquid beta emitters, which automates the whole processes ranging from collection of a sample to production of final measurement results, and adopts an algorithm for simultaneously analyzing mixed beta emitters so as to analyze various nuclides at the same time. In addition, a central PC can remotely control the analyzer and transceive the resulting data through a long-range communication network. Owing to lightness of the analyzer according to the present invention, the accessibility to the analyzing site will be improved and the installation of the analyzer becomes easier. By using the electronics and IT technologies being rapidly advanced recently to process and analyze the measured signal, the present invention exhibits high performance, multi-functionality, and high efficiency.

DISCLOSURE OF INVENTION

Technical Problem

Therefore, the present invention has been made in view of the above-mentioned problems, and it is an object of the present invention to provide an automatic radioactivity analyzer of mixed liquid beta emitters, which automatically performs the whole processes, including e.g. collecting a sample, preparing, injecting and measuring a sample to be measured, and adopts a mixed beta emitter analyzing algorithm, so that the respective radioactivity concentrations can be analyzed from the mixed beta emitters. In the present invention, by utilizing a fast coincidence count circuit and PAC (pulse amplitude comparison) function, the lowest limit of the detection value that can meet the legal requirements for radioactive liquid wastes can be achieved without shielding with the lead, thereby implementing lightness of this analyzer. Also, the present invention adopts a central controlling PC that remotely controls the analyzer and transmits and receives final analysis results, so that the respective radioactivity concentrations of the mixed beta emitters existing in the liquid wastes can be automatically analyzed.

Technical Solution

To achieve the above object, according to the present invention, there is provided an automatic radioactivity analyzer of a mixed liquid beta emitter using a liquid scintillation counter, which comprises: a sample preparation part for extracting a liquid sample from liquid-phase radioactive nuclear wastes; a sample injection part, including a sample transportation part for transporting a bottled sample to a radioactivity detection part to perform measurement; the radioactivity detection part including two photon multiplier tubes; an exterior gamma-ray source injection part for compensating for measurement efficiency according to quenching effects; a signal processing part, including a pre-amplifier circuit, a high-voltage generator circuit, an analogue-to-digital converter circuit, and a digital signal processor (DSP), for generating beta spectrums by the aid of a fast coincidence counter and a multi-channel analyzer; a main control PC and a graphic user interface (GUI) program for remotely automatically measuring the sample and analyzing the beta emitter; and an Ethernet communication part for performing the remote-control of the analyzer and long-range reception/transmission of the measured data.

In order to automatically extract a sample on-line, a washing water piping 1, a sample reservoir piping 2, and a drain-outlet piping 3 are interconnected, and a 3-way valve 5 and a quantitative pump 6 are utilized therefor. Feeding of the sample, washing water, and liquid scintillator will be described in detail. A capping unit for capping a sample measurement bottle includes a capping tool 40, a small DC motor 40, and a timing belt 40. The capping tool is designed so that it can be grasping a lid of the sample measurement bottle while the lid is open. In addition, four clampers are designed to be given the proper elastic forces in order that the lid cannot be too overly fastened to the bottle. An air cylinder 43 is utilized to prevent the damage of the sample measurement bottle due to up-and-down moving of the sample measurement bottle when the lid thereof is being opened or closed. Additionally, by eliminating air pressure in the air cylinder at the time motor starts revolving, the free elevational movement can be achieved. The amount of sample injected is adjusted by utilizing a quantitative pump 6 and controlling the operation time thereof. The liquid scintillator is injected at predetermined amount by using an electronic dispenser 7, because it is not necessary to wash the feed pipings. One of the two 3-way valves is for selecting which of the sample or the washing water should be supplied in. The other 3-way valve decides the direction of drainage of the sample measurement bottle or the drain-outlet. The tube for feeding the sample is implemented by silicone and C-Flex. The liquid scintillator is made by a Teflon tube, because the scintillator contains organic materials. The process of mixing the sample and the liquid scintillator includes the following steps: 1) a 3-way valve V2 is manipulated to have a sample supplied, and the liquid tube, in which the washing water is filled, is filled with the sample by operating the quantitative pump; 2) at the moment the electronic dispenser radiates the liquid scintillator to the sample measurement bottle, a 3-way valve V3 is manipulated to select a sample measurement bottle, in order to mix the two liquids, both of which are entering simultaneously; 3) after the sample enters, the output-stage 3-way valve V3 is switched to the direction of drain-outlet and the input-stage 3-way valve V2 is switched to selecting the washing water to wash the tube, and after washing for a certain time, the operation of the quantitative pump is stopped to finish the mixing process.

The sample transportation part for transporting the prepared bottled sample for continual measurement, moves right-and-left up-and-down, picks the bottled sample to be measured, pushes it in an LSD (liquid scintillation counter device) to block the exterior light, and after measurement, draws the bottle out of the LSD, under the control of the controller. This operation is driven by the combination of an air compressor apparatus and a stepping motor. The major constituents of the sample transportation part are a loading cylinder 38 for moving up and down a sample carrying table 37, a sample cylinder 39 for pushing up or pulling down the bottled sample 35 into or from the LSD 32, a sample clamper 34 for clamping the sample to transport the sample, and an X-Y stage 33 for controlling the right and left movement of the bottled sample on the sample carrying table 37.

In the method of measuring radioactivity using a liquid scintillation detector (LSD), if the beta-ray radiated from the sample excites the scintillator, the excited scintillator fluoresces 350-400 nm wavelength light, and this light forms photons to be detected by the PMT. In the mixed sample to be measured, the quenching is quite important to yield a correct measuring efficiency. To earn the influence of the quenching on the measuring efficiency, a 180° rotational gamma-ray source transportation apparatus for illuminating the exterior gamma-ray source 12. The apparatus is built a two-ply shielding structure which includes the combination of a lead shielding material and a copper shielding material, since the gamma-ray may give rise to radioactive damage. Also, it includes two limit switches for precise transportation operation, both of which are located at an angle of 180°.

The radioactivity detection box, using a liquid scintillation counter, LSD, is a structure not having a lead shielding material for reducing the weight of the overall analyzer. It includes two PMTs, both of which are located so as to face each other with respect to the center-positioned sample, so that they can detect only a signal simultaneously detected from the two detection parts using a coincidence count circuit. For the light shield, the inner and outer surfaces of the LSD are black anodized.

For processing the detected signal, MCA circuit for analyzing the beta emitter utilizes a DSP circuit to achieve a coincidence count function. For the convenient system upgrade and maintenance, the MCA circuit is divisionally built by a pre-amplifier circuit 14, a high-voltage generator circuit 15, an analogue-to-digital converter (ADC) circuit 21, and a digital signal processor (DSP). A module of the pre-amplifier circuit amplifies the signals outputted from the anode output terminal of the two PMTs, and is connected with a signal detection board including the analogue-to-digital converter circuit. The MCA board is divided by a main MCA 22 and a sub-MCA 23 for achieving dual MCA functions. The function of the main MCA is similar to that of the sub-MCA, except that the main MCA is in charge of coincidence count function. Therefore, it is possible to perform an independent spectrum analysis by using the left and right PMTs. In addition, it is possible to utilize a PAC (pulse amplitude comparison) function that compares the ratio of the magnitude of the amplitudes generated from the two detection parts, and thereby blocking abnormal signal which is generated from the region that is not a sample.

Figure 3:
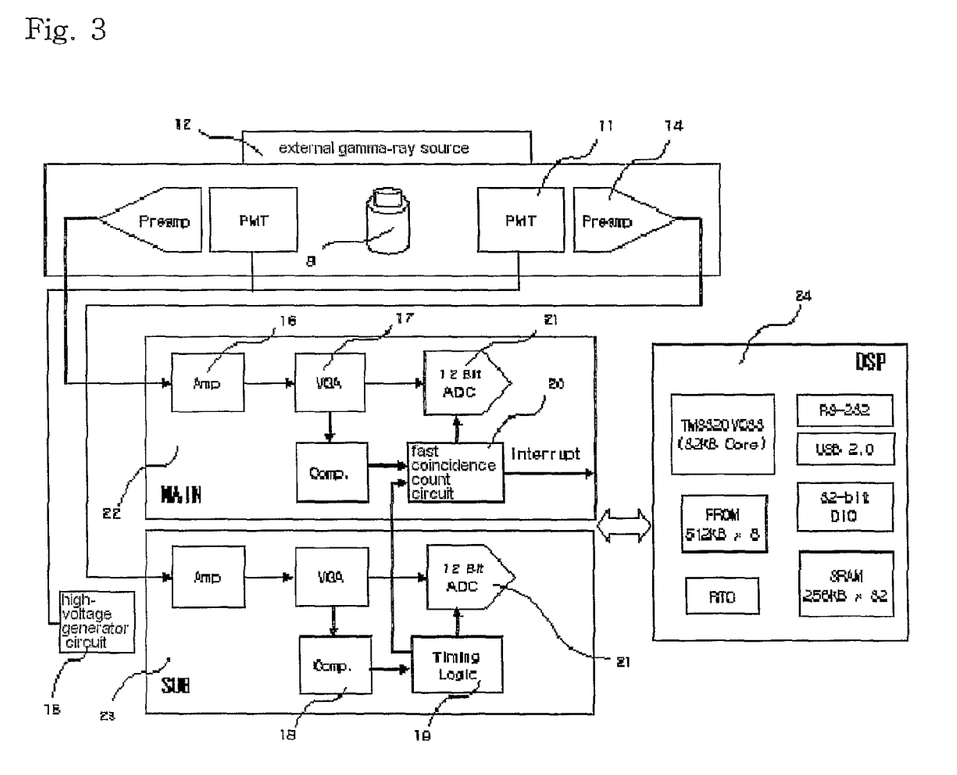
FIG. 3 is a block diagram of a coincidence count circuit and MCA circuit of an automatic radioactivity analyzer of mixed liquid beta emitter according to the present invention.

FIG. 3 is a block diagram of the MCA circuit for beta emitter analysis. As shown in FIG. 3, the high voltage over 1,000V is applied to the two PMTs via the high-voltage generator circuit board. For the ADC circuit board, a 12-bit ADC is used so that 4,096 channels can be formed for energy measurement, the ADC being designed so as to have about 1.6 μs conversion time and about 30 μs fixed dead time. A fast coincidence count circuit is adapted to count only the signal pulse which has been simultaneously detected by the two detection parts. By adopting the coincidence count circuit, the background count rate can be reduced by eliminating the noise pulse from the PMT, and the count efficiency for the nuclide radiating low energy beta-ray, such as tritium (3H) or the like, can be increased. This circuit doing fast coincident count with 100 ns coincidence timing bandwidth performs the functions of selecting coincidence or non-coincidence, detecting a pulse peak, initiating ADC, generating an interrupt signal synchronized with the pulse peak. Since the coincidence count circuit was implemented by FPGA (field programmable gate array), the size of the circuit was quite reduced, the security of the circuit was increased, and the upgrade of the logic became easy.

Figure 2:
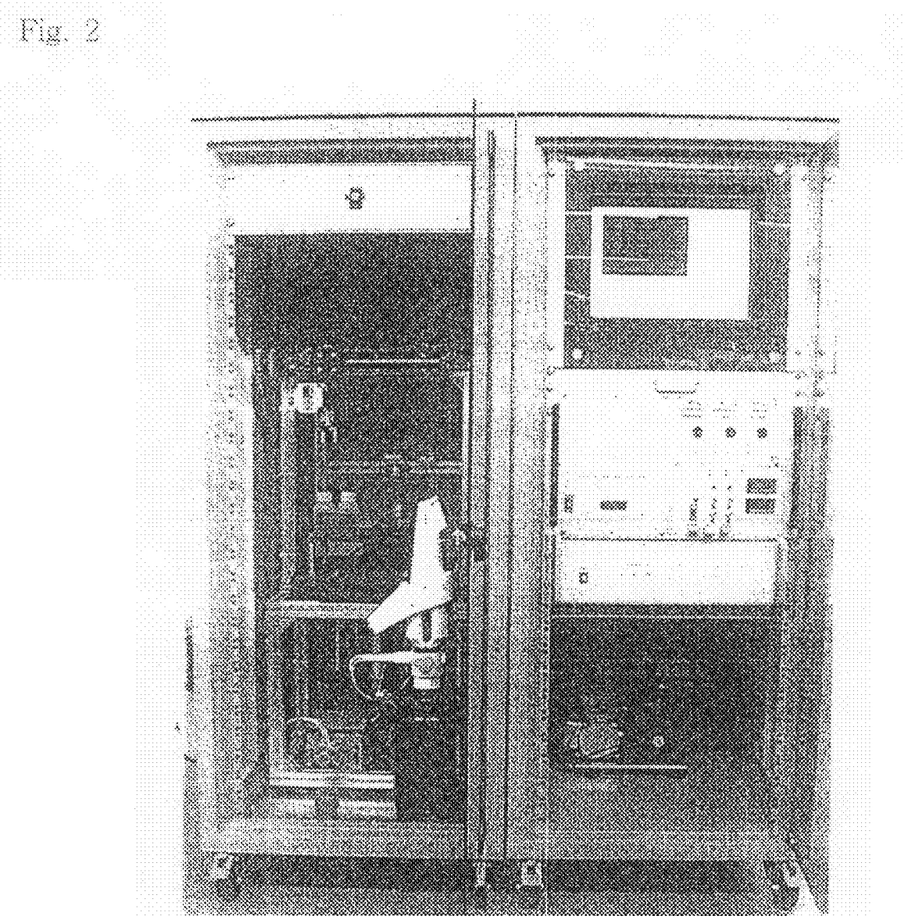
FIG. 2 is a photograph of an automatic radioactivity analyzer of mixed liquid beta emitter according to the present invention.

The configured system is, as shown in FIG. 2, installed in two standard racks. In the left-side rack, a sample mixing part and an automatic transportation part including the LSD (liquid scintillation detector) are installed. In the lower part thereof, the quantitative pump for liquid, the electronic dispenser, and the liquid scintillator preserving bottle connected to the dispenser are built therein. In the right-side rack, the main control PC, an LCD monitor, a motor controller, a data acquisition controller, and an ADC signal processing board are mounted therein. In the lower space, an air compressing pump is installed.

The main control PC controls, via RS-232 communication protocol, a DSP circuit board, which implements the MCA controller having a signal detection and coincidence count circuit, motor controllers for controlling four motors (two of which are stepping motors adapted to the X-Y stage, one of which is a stepping motor for turning on and off the exterior standard gamma-ray source, and one of which is a small DC motor in the capping unit), and the electronic dispenser for equally injecting the liquid scintillator. Especially, a conversion module for converting from RS-232 to RS-485 which is capable of multi-axis controlling, in order to control the four motor controllers via a single serial port. Since the PC can perform all of the operation control necessary for an automatic measurement, i.e., automatic sequence operation, automatic measurement, automatic data acquisition, and automatic nuclide analysis, the remote control was implemented. All of the controls are implemented by the integrated Windows OS program written in LabWindows/CVI. This program has an automatic mode for automatically performing from measuring to analysis; and a manual mode for selectively performing the respective functions, such as transporting a sample, capping and mixing a sample, turning on and off the high voltage, illuminating the exterior gamma-ray source, or the like. Also, the program has functions of adjusting the high-voltage, setting the measurement time, and acquiring data using PAC. In addition, to analyze mixed beta spectrum, an algorithm for plotting quenching curve for every nuclides, based on the least square method, and an analysis algorithm with an algorithm for calculating radioactivity values for every nuclides have been developed. By adopting these algorithms, mixed beta emitters can be analyzed simultaneously.

Hereafter, the automatic radioactivity analyzer according to the present invention will be described in detail with reference to the drawings.

Figure 1:
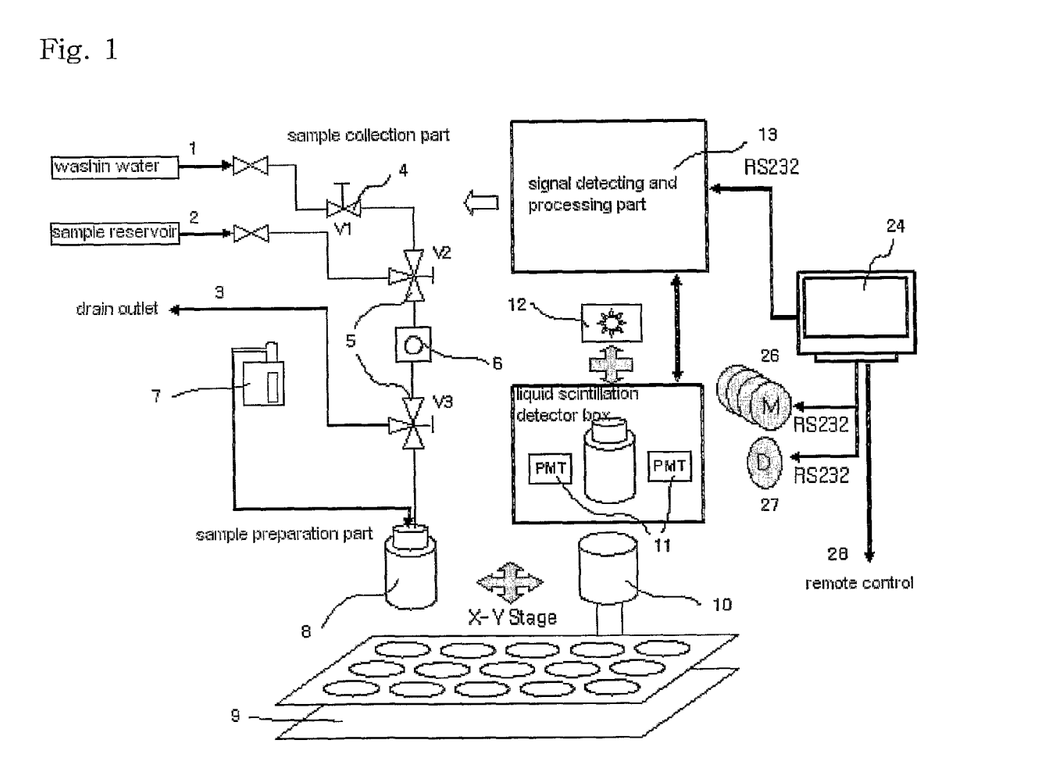
FIG. 1 is a block diagram of an automatic radioactivity analyzer of mixed liquid beta emitter according to the present invention.
Figure 4:
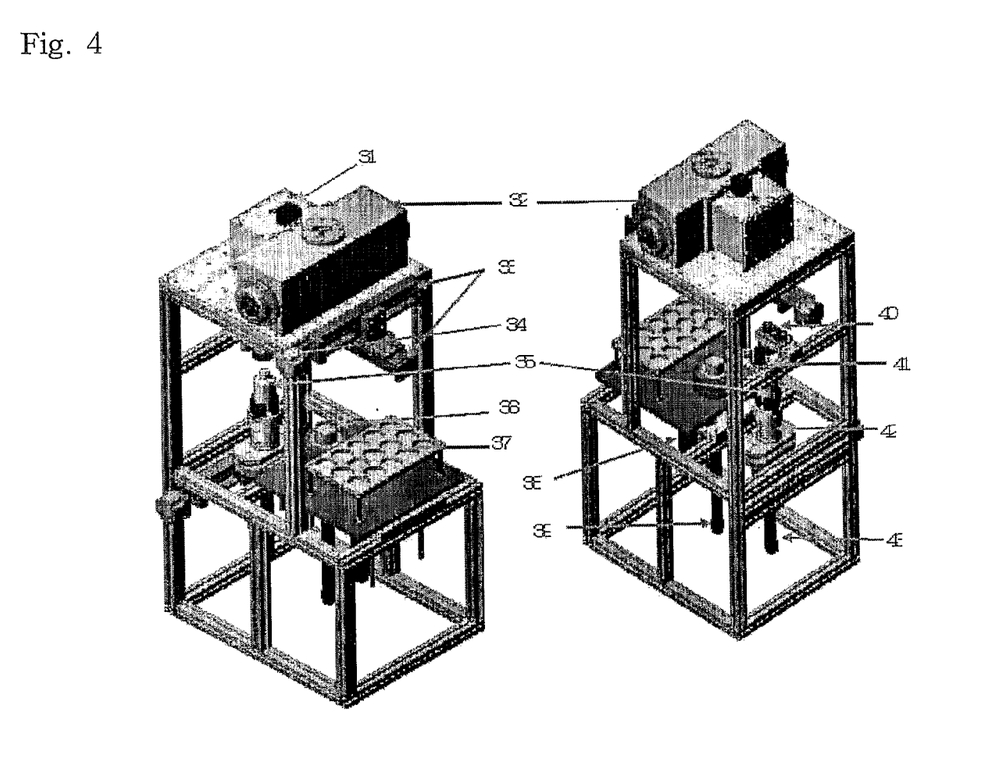
FIG. 4 is a schematic view of a sample injection part and LSD of an automatic radioactivity analyzer of mixed liquid beta emitter according to the present invention.
Figure 5:
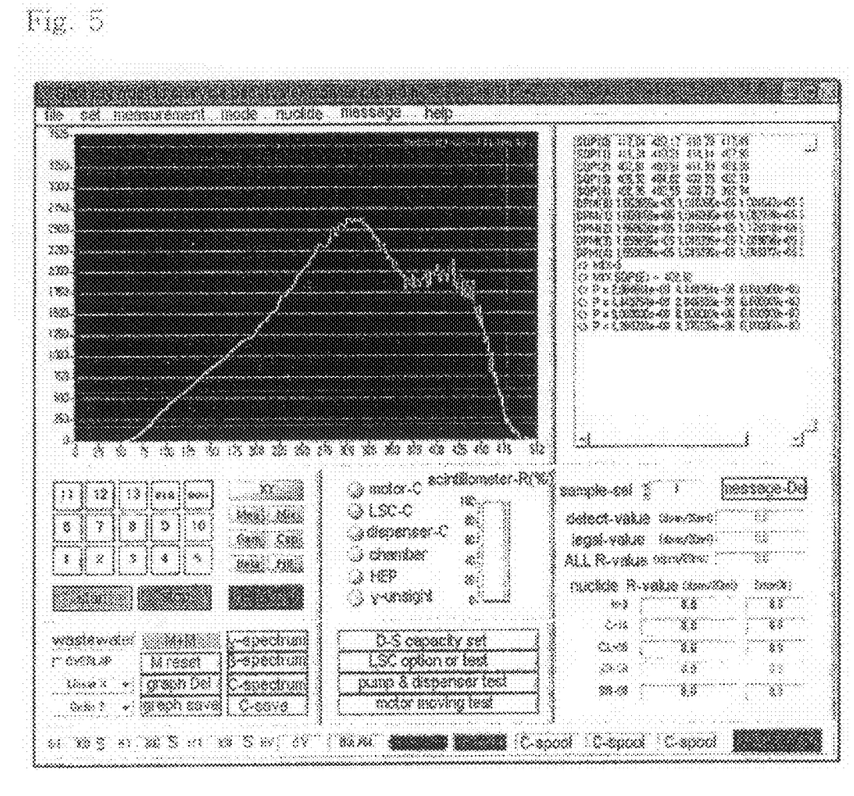
FIG. 5 is an initial starting screen of a user interface for a general operating program of an automatic radioactivity analyzer of mixed liquid beta emitter according to the present invention.

With reference to FIGS. 1, 3, and 4, the present invention relates to an automatic radioactivity analyzer of mixed liquid beta emitter, which comprises: a sample preparation part 1, 2, 3, 4, 5, 6, and 7; a sample injection part, including a sample transportation part for transporting a bottled sample to a radioactivity detection part to perform measurement; a radioactivity detection part 11 including two photon multiplier tubes; an exterior gamma-ray source injection part 12 for compensating for measuring efficiency according to quenching effects; a signal processing part 13, including a pre-amplifier circuit 14, a high-voltage generator circuit 15, an analogue-to-digital converter circuit 21, and a digital signal processor (DSP) 24, for creating beta spectrum by the aid of a fast coincidence counter 20 and a multi-channel analyzer 22; a main control PC 25 and a graphic user interface (GUI) program 29 for remotely automatically measuring the sample and analyzing the beta emitter; and an Ethernet communication part 28 for performing the remote-control of the analyzer and long-range reception/transmission of the measured data.

ADVANTAGEOUS EFFECTS

The automatic radioactivity analyzer of mixed liquid beta emitters according to the present invention has advantageous effects in that, by automating the whole processes, from preparation to analysis of a sample, the efficiency of the radioactivity analysis can be significantly improved, and by utilizing a fast coincidence count circuit, the influence of the exterior radioactivity can be minimized. In addition, by adapting PAC circuit (pulse amplitude comparison circuit) to the two PMTs, the noise in the detection part is reduced, and hence the LSD is not needed to be shielded with the lead, thereby implementing lightness of the analyzer. Further, by using an algorithm for simultaneously analyzing mixed beta emitters, it is possible to analyze various nuclides at the same time. Therefore, the present invention is expected to greatly reduce the manpower and the costs in monitoring environmental radioactivity.

DESCRIPTION OF DRAWINGS

The above and other objects, features, and advantages of the present invention will become more apparent from the following description when taken in conjunction with the accompanying drawings, in which.

BEST MODE FOR INVENTION

Hereinafter, the present invention will be described in detail with reference to the attached drawings. The sample injection part, with reference to FIGS. 1, 2, and 4, of the present invention is composed of a sample preparation part 1, 2, 3, 4, 5, 6, and 7 for extracting a liquid sample from liquid-phase radioactive nuclear waste to prepare a sample to be measured; a sample transportation part 9, 10 for transporting the bottled sample prepared by the sample preparation part to a radioactivity detection part to perform measurement; and an exterior gamma-ray source injection part 12 for compensating for measuring efficiency according to quenching effects.

The sample preparation part is composed of a washing water piping 1, a sample reservoir piping 2, and a drain-outlet piping 3, interconnected with one another in order to automatically extract a sample on-line; a sample measurement bottle 8 connected to a 3-way valve 5; a quantitative pump 6 connected to one side of the bottle 8; and an electronic dispenser 7.

The sample transportation part 9, 10 is composed of a sample carrying table 37 including a sample supporter 36 for supporting the sample measurement bottle 8 prepared by the sample preparation part and a sample bottle fixing tool 42 for fixing the lower part of the sample measurement bottle; an X-Y stage 33 for moving up-and-down, right-and-left the sample carrying table 37; a loading cylinder 38 for moving up and down the sample carrying table 37; a sample cylinder 39 for pushing up or pulling down the bottled sample 35 into or from the LSD 32; a sample clamper 34 for clamping the sample measurement bottle to transport it; a capping unit and a capping motor 40 for capping a sample measurement bottle and fastening a lid thereof; and an air cylinder 43 for lowering the pressure in the cylinder so that the undue stress is not exerted to a capping tool when in capping.

Turning to FIGS. 1 and 3, a signal detecting and processing part 13 for processing the signal detected from the sample injected in the LSD via the sample transportation part, includes a two PMTs (photon multiplier tubes) 11 which are spaced apart from each other at a certain interval, a pre-amplifier circuits 14, each of which is installed in the rear of the PMTs 11, a main MCA 22 and a sub-MCA 23 which are connected with the two pre-amplifier circuits 14, respectively.

The main MCA 22 includes a linear amplifier 16 connected to the pre-amplifier 14; a peak detection circuit 17 for detecting the peak of the signal from the linear amplifier 16; a comparator IC 18 for comparing/analyzing the signal from the peak detection circuit 17; a fast coincidence count circuit 20 for counting only the signal which has been simultaneously detected, in response to the signals from the comparator IC 18 and a timing logic circuit 19 of the sub-MCA 23; an ADC (analog-to-digital converter) 21 for compositively converting the signals from the peak detection circuit 17 and the fast coincidence count circuit 20

The sub-MCA 23 includes a linear amplifier 16 connected to the pre-amplifier 14; a peak detection circuit 17 for detecting the peak of the signal from the linear amplifier 16; a comparator IC 18 for comparing/analyzing the signal from the peak detection circuit 17; a timing logic circuit 19 for analyzing the signal from the comparator IC 18, and sending the analyzed signal to the fast coincidence count circuit 20 of the main MCA 22 and the ADC 21 of the sub-MCA 23; an ADC 21 for converting the signal from the timing logic circuit 19.

INDUSTRIAL APPLICABILITY

In the mean time, since most of the radioactive isotopes, which are used for the purpose of medical diagnoses and studies, radiate beta-ray, it is quite important to monitor the radioactive nuclides in the liquid wastes produced when treating the radioactive isotopes, from the viewpoint of national health and environmental preservation. However, it was very difficult to regularly monitor and supervise the radioactive nuclide effluences, because the beta-ray has a short linear range and the attenuation effect due to self-absorption makes measurement difficult. On the other hand, since in the analyzing apparatus of the present invention, a sample is automatically acquired from the exhaust line for liquid wastes or reservoir and it is possible to remotely measure and analyze by using a central computer, regularly monitoring the liquid wastes whose radioactive level is high and the real-time monitoring the contaminated territories become possible. To monitor the radioactivity in the liquid wastes, produced by the facilities using the radioactive isotopes and any other nuclear equipments, is one of the national undertakings which should be achieved continuously from the viewpoint of national health and environmental preservation. In addition, it is very important to promptly and accurately analyze the beta emitter, for making preparation of emergent accidents of nuclear facilities. From the foregoing, an automatic radioactivity analyzer of the respective radioactivity densities of the mixed liquid beta emitter according to the present invention is expected to contribute to the effective and prompt monitoring of the effluences from the facilities using the radioactive isotopes and any other nuclear equipment.

The invention claimed is:

1. An automatic radioactivity analyzer of mixed liquid beta emitter, comprising: a sample preparation part (1, 2, 3, 4, 5, 6, and 7) for extracting a liquid sample from liquid-phase radioactive nuclear wastes; a sample injection part (9 and 10), including a sample transportation part for transporting a bottled sample to a radioactivity detection part to perform measurement; the radioactivity detection part (11) including two photon multiplier tubes; an exterior gamma-ray source injection part (12) for compensating for measurement efficiency according to quenching effects; a signal processing part (13), including a pre-amplifier circuit (14), a high-voltage generator circuit (15), an analogue-to-digital converter circuit (21), and a digital signal processor (DSP) (24), for generating beta spectrums by the aid of a fast coincidence counter (20) and a multi-channel analyzer (22); a main control PC (25) and a graphic user interface (GUI) program (29) for remotely automatically measuring the sample and analyzing the beta emitter; and an Ethernet communication part (28) for performing the remote-control of the analyzer and long-range reception/transmission of the measured data.

2. The automatic radioactivity analyzer of mixed liquid beta emitter according to claim 1,
   wherein the sample injection part comprises a sample preparation part (1, 2, 3, 4, 5, 6, and 7) for extracting a liquid sample from liquid-phase radioactive nuclear wastes to prepare a sample to be measured; and a sample transportation part (9, 10) for transporting the bottled sample (8) prepared by the sample preparation part to a radioactivity detection part to perform measurement,
   wherein the sample preparation part includes a washing water piping (1), a sample reservoir piping (2), and a drain-outlet piping (3), interconnected with one another in order to automatically extract a sample on-line; a sample measurement bottle (8) connected to a 3-way valve (5); a quantitative pump (6) connected to one side of the bottle (8); and an electronic dispenser (7), and
   wherein the sample transportation part (9, 10) includes a sample carrying table (37) including a sample supporter (36) for supporting the sample measurement bottle (8) prepared by the sample preparation part and a sample bottle fixing tool (42) for fixing the lower part of the sample measurement bottle; an X-Y stage (33) for moving up-and-down, right-and-left the sample carrying table (37); a loading cylinder (38) for moving up and down the sample carrying table (37); a sample cylinder (39) for pushing up or pulling down the bottled sample (35) into or from the LSD (32); a sample clamper (34) for clamping the sample measurement bottle to transport it; a capping unit and a capping motor (40) for capping a sample measurement bottle and fastening a lid thereof; and an air cylinder (43) for lowering the pressure in the cylinder so that the undue stress is not exerted to a capping tool when capping.

3. The automatic radioactivity analyzer of mixed liquid beta emitter according to claim 1,
   wherein a signal detecting and processing part (13) for processing the signal detected from the sample injected in the LSD via the sample transportation part, comprises a two PMTs (photon multiplier tubes) (11) which are spaced apart from each other at a certain interval, a pre-amplifier circuits (14), each of which is installed in the rear of the PMTs (11), a main MCA (22) and a sub-MCA (23) which are connected with the two pre-amplifier circuits (14), respectively,
   wherein the main MCA (22) includes a linear amplifier (16) connected to the pre-amplifier (14); a peak detection circuit (17) for detecting the peak of the signal from the linear amplifier (16); a comparator IC (18) for comparing/analyzing the signal from the peak detection circuit (17); a fast coincidence count circuit (20) for counting only the signal which has been simultaneously detected, in response to the signals from the comparator IC (18) and a timing logic circuit (19) of the sub-MCA (23); an ADC (analog-to-digital converter) (21) for compositively converting the signals from the peak detection circuit (17) and the fast coincidence count circuit (20), and wherein the sub-MCA (23) includes a linear amplifier (16) connected to the pre-amplifier (14); a peak detection circuit 17 for detecting the peak of the signal from the linear amplifier (16); a comparator IC (18) for comparing/analyzing the signal from the peak detection circuit (17); a timing logic circuit (19) for analyzing the signal from the comparator IC (18), and sending the analyzed signal to the fast coincidence count circuit (20) of the main MCA (22) and the ADC (21) of the sub-MCA (23); an ADC (21) for converting the signal from the timing logic circuit 19.

4. The automatic radioactivity analyzer of mixed liquid beta emitter according to claim 3, wherein the signal detecting and processing part (13) comprises: a pre-amplifier (14) for amplifying a signal received from two PMTs (11); a linear amplifier 16 and a measured signal detection circuit (13) for shaping and amplifying again a signal from the pre-amplifier (13); and a fast coincidence count circuit 20 with 100 ns coincidence timing bandwidth, whereby a coincidence timing signal is transmitted to the ADC (21), the converted digital signal is transmitted to DSP (24) as an interrupt-initiating signal, and radiation received is counted by the magnitudes of the energy level so that the amplitudes can be multiply analyzed.

5. The automatic radioactivity analyzer of mixed liquid beta emitter according to claim 3, wherein the signal detecting and processing part (13) applies a mixed beta emitter analysis algorithm using a least square method to a mixed beta spectrum measured, so as to simultaneously analyze multiple mixed beta emitters from a sing sample to be measured.

6. The automatic radioactivity analyzer of mixed liquid beta emitter according to claim 3, wherein the signal detecting and processing part (13) is characterized by designing the digital coincidence count circuit having 100 ns short coincidence timing bandwidth, which is located at the rear stage of the pre-amplifier, using a FPGA technique, thereby implementing lightness of the analyzer and minimizing the background count rate.

7. The automatic radioactivity analyzer of mixed liquid beta emitter according to claim 3, wherein the MCA board is so manufactured as to be divided into a main MCA (22) and a sub-MCA (23), so that it is possible to perform an independent spectrum analysis by using left and right PMTs, and it is possible to implement a PAC (pulse amplitude comparison) function using a software, thereby minimizing optical crosstalk occurring in the detection part so as to lower the minimum limit of the detecting value.

* * * * *